United States Patent

[11] 3,632,121

[72] Inventor Gunnar A. Wahlmark
　　　　　　Rockford, Ill.
[21] Appl. No. 840,590
[22] Filed June 25, 1969
[45] Patented Jan. 4, 1972
[73] Assignee Wahlmark Systems, Inc.
　　　　　　Chicago, Ill.
　　　　　　Continuation of application Ser. No.
　　　　　　635,429, May 2, 1967. This application
　　　　　　June 25, 1969, Ser. No. 840,590

[54] PISTON RING CONSTRUCTION
　　　1 Claim, 3 Drawing Figs.
[52] U.S. Cl............................................ 277/188,
　　　　　　　　　　　　　　　　　　　　277/176, 277/194
[51] Int. Cl...................................................... F16j 15/00

[50] Field of Search............................................ 277/193,
　　　　　　　　194, 235, 176, 173, 188, 192, 198, 214; 92/249

[56]　　　　　　　　References Cited
　　　　　　　　UNITED STATES PATENTS
2,349,170　5/1944　Jackman....................... 277/176
2,792,790　5/1957　Capps............................ 277/177 X
2,973,978　3/1961　Oppenheim.................. 277/188
3,261,613　7/1966　Norick et al.................. 277/176

Primary Examiner—Samuel B. Rothberg
Attorney—Hume, Clement, Hume & Lee

ABSTRACT: A seal arrangement for relatively movable components including a seal ring assembly seated in a receiving groove. The ring assembly includes a plastic ring and a metal backup ring. The plastic ring is formed so that both a radial and axial seal is effected.

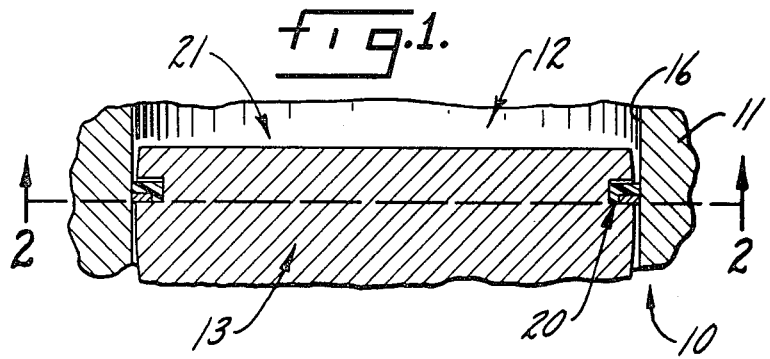
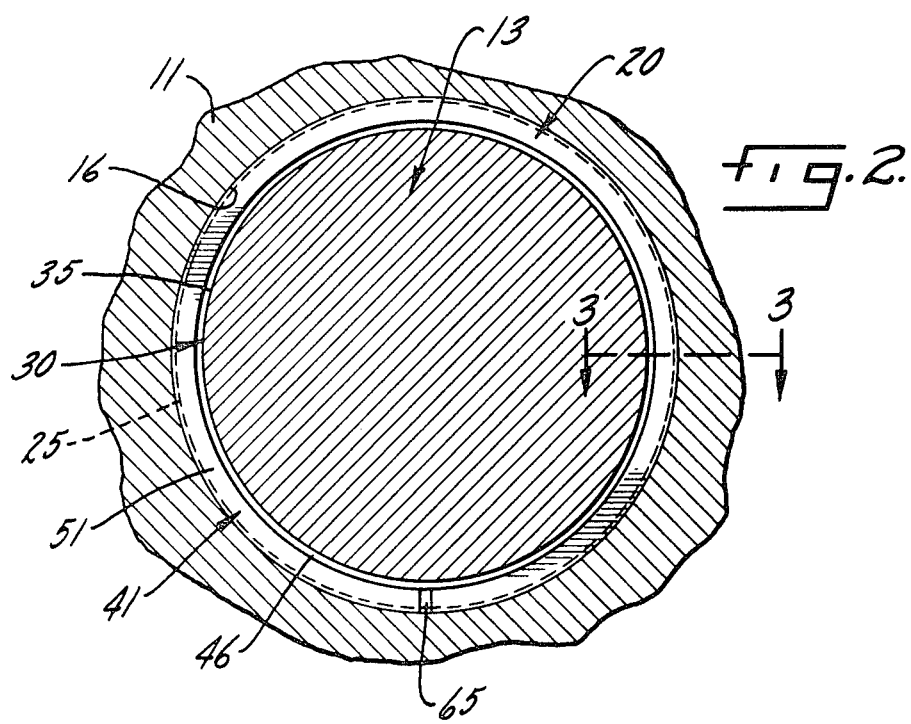
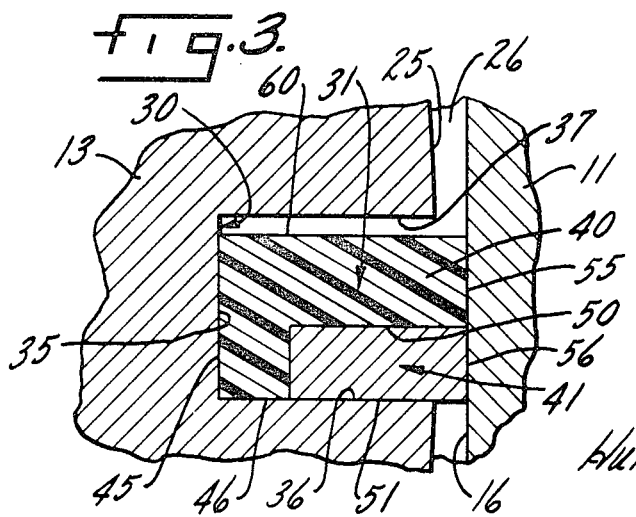

PISTON RING CONSTRUCTION

This application is a continuation of the copending application of Gunnar A. Wahlmark, Ser. No. 635,429, filed May 2, 1967, on an IMPROVED PISTON RING CONSTRUCTION.

This invention relates in general to fluid seals. It deals more particularly with a new and improved fluid seal arrangement.

In high-performance fluid devices such as the swashplate motors and pumps presently used in missiles and aircraft, for example, it is imperative that effective seals be provided between relatively reciprocable components such as pistons and cylinders, relatively rotatable components such as trunnions and cylinder barrel support yokes, and relatively static components also. Most of the seal arrangements presently utilized are either inconsistently effective over extended service operation of a fluid device, or are so precision designed and manufactured as to be prohibitively expensive.

Accordingly, it is an object of the present invention to provide a new and improved seal arrangement which is ultimately simple and inexpensive in construction, yet is highly effective over a long service life of a fluid device, regardless of whether used in a reciprocating, rotating, or static capacity.

It is another object to provide a fluid seal arrangement for a high-pressure fluid device which effectively seals against relatively coarse surfaces.

It is still another object to provide a seal arrangement wherein the sealing surfaces needn't be ground smooth to achieve a highly effective seal.

It is yet another object to provide a seal arrangement which facilitates variation in attitude between relatively movable parts without loss of sealing effectiveness.

The foregoing and other objects are realized in accord with the present invention in seal arrangement by seating a seal ring assembly, including a plastic ring and a metal backup ring, in a receiving groove to establish a seal between the component in which the groove is formed and a mating component. The plastic ring is formed so that both a radial and an axial seal is effected. The plastic ring is preferably Teflon or a material having like characteristics and it readily conforms to slight irregularities in sealing surfaces formed by machining or the like.

The plastic ring and its metal backup ring are so arranged in cylinder-piston applications that a tilt of the piston in the cylinder is accommodated without loss of sealing effectiveness. In all applications of the seal arrangement embodying features of the present invention, the backup ring effectively prevents extrusion of the plastic under extremely high pressures.

The invention, both as to its organization and method of operation, taken with further objects and advantages thereof, will best be understood by reference to the following description taken in connection with the accompanying drawings, in which:

FIG. 1 is a fragmentary view of a portion of a cylinder-piston assembly in a swashplate-type fluid device, wherein a seal arrangement embodying features of the present invention is employed to establish and maintain a fluidtight seal between the cylinder and piston components;

FIG. 2 is a sectional view taken along line 2—2 of FIG. 1; and

FIG. 3 is an enlarged sectional view taken along line 3—3 of FIG. 2.

Referring now to the drawings, and particularly to FIG. 1, a portion of a cylinder-piston assembly for a swashplate fluid device (not shown) is seen generally at 10. The cylinder-piston assembly 10 includes a cylinder barrel 11 (only partially shown) having a plurality of cylinders 12 (only one partially shown) formed therein, and a piston 13 slidable in each cylinder.

Providing a fluidtight seal between the piston 13 illustrated and the cylindrical inner wall 16 of the cylinder 12 is a seal arrangement 20 embodying features of the present invention. The seal arrangement 20 maintains a fluidtight seal between the piston 13 and the cylinder wall 16 while fluid pressures of the order of 15,000 p.s.i. or greater are developed in the pressure area 21 above the piston, in a well-known manner. In accord with the present invention, the seal arrangement 20 maintains the aforedescribed fluidtight seal throughout slight tilting of the piston 13 in the cylinder 12 normally encountered in operation of a swashplate fluid device of the type in question. Furthermore, the seal arrangement 20 maintains a virtually perfect seal while subjected to high fluid pressures even though a sealing surface might have the relatively rough character provided by machining only, without finish grinding. Nevertheless, the seal arrangement 20 is relatively simple and inexpensive.

Referring now to FIGS. 2 and 3, the segmentally spherical outer surface 25 of the piston 13 is seen to be slightly smaller in diameter (at its widest point) than the cylindrical inner wall 16 of the cylinder 12, leaving a space 26 between the cylinder wall 16 and the piston surface 25. Accordingly, the piston 13 is freely slidable in the cylinder 12. The segmentally spherical configuration of the surface 25 accommodates the slight relative tilting of the piston 13 in the cylinder 12 of the illustrative swashplate-type fluid device.

The seal arrangement 20 includes an annular groove 30 machined in the circumference of the outer surface 25 of the piston 13, perpendicular to the axis of the piston, and a seal assembly 31 seated in the groove. The seal assembly 31 maintains a seal between the groove 30 in the piston 13 and the cylindrical inner wall 16 of the cylinder 12, as the piston 13 slides in the cylinder. This fluidtight seal is maintained under fluid pressures as high as 15,000 p.s.i. or greater even though the groove 30 is merely machined in the position 13 and not finish ground.

The groove 30 is uniformly rectangular in cross-sectional configuration around its entire length, and includes a circular cylindrical base 35, a planar lower surface 36, and an identical planar upper surface 37. The groove 30 is formed by machining in a well-known manner, and need not be finish ground for the seal assembly 31 to achieve the intimate surface contact required for an effective high-pressure fluid seal.

The seal assembly 31 includes an L-shaped (in cross section) Teflon ring 40 facing the pressure area 21 of the cylinder-piston assembly 10, and a steel backup ring 41 generally opposite the plastic ring 40 from cylinder pressure. Teflon is the DuPont trademark applied to polymers of tetrafluoroethylene. The plastic ring 40 provides a continuous radial and axial seal between the base 35 and lower surface 36 of the groove 30, and the cylinder wall 16, while the steel ring 41 prevents extrusion of the plastic as pressure is developed in the cylinder pressure area 21.

The plastic ring 40 includes an inner circular cylindrical face 45 having an inside diameter substantially equal to or slightly less than the outside diameter of the circular cylindrical base 35 in the groove 30. Accordingly, the Teflon ring 40 seats snugly against the base 35 in the groove 30 when it is seated in the groove by distending the ring and snapping it over the cylindrical outer surface 25 of the piston 13.

The lower planar face 46 of the Teflon ring 40 is relatively short and immediately adjacent its cylindrical inner face 45. The planar lower face 46 extends radially outwardly of the cylindrical inner face 45 and terminates at the steel backup ring 41, which is snugly seated in a recess 50 formed in the Teflon ring 40. It is, as will be recognized, the presence of the recess 50 which gives the Teflon ring 40 its L-shaped cross-sectional configuration. In this light, the cross-sectional configuration of the steel backup ring 41 is rectangular and its dimensions identical to the recess 50 when the ring assembly is in operation.

The planar lower face 51 on the steel backup ring 41 is coextensive with the lower face 46 on the Teflon ring 40, and the rings 40 and 41 extend in complementary relationship, as illustrated, to their coextensive outer circular cylindrical faces 55 and 56, respectively. The radial width of the Teflon ring 40 is slightly greater than the depth of the groove 30 plus the width of the gap 26 and, accordingly, an interference fit is established between the ring 40 and the circular cylindrical inner wall 26 of the cylinder 12.

The steel ring 41 is split at 65, as seen in FIG. 2, to define a gap and form a radially resilient ring in a well-known manner. The split ring 41 can thus be expanded radially so that it can be slipped over the cylindrical outer surface 25 on the piston 13 to seat it in the groove 30, in company with the Teflon ring 40 which is inherently slightly elastic. The ring 41 has an outside diameter slightly greater than the inside diameter of the cylinder wall 25 so that radial resiliency constantly urges its outer face 56 into engagement with the wall 26.

The axial thickness of the combined rings 40 and 41 is slightly less than the height of the groove 30, as will also be noted, especially in FIG. 3. The rings 40, 41 and groove 30 are purposely constructed in this manner to permit unrestricted ease of insertion of the rings in the groove and, more importantly, to permit unimpeded impingement of fluid under pressure upon the upper face 60 of the Teflon ring 40. Accordingly, during a pressure stroke in the cylinder-piston assembly 10, a pressure clamping of the combined rings 40, 41 against the lower surface 36 in the groove 30 is achieved.

Fluid pressure exerted on the face 60 of the Teflon ring 40 thus forces the face 46 of the ring 40 into intimate sealing engagement with the lower surface 36 in the groove 30. This fluid pressure is effective to force the face 46 against the surface 36, and the Teflon ring 31 tightly against the steel ring 41, because only casing pressure (approximately atmospheric) is effective between the face 46 and surface 36 due to their machined finishes. With the Teflon ring 40 radially compressed between the cylinder wall 25, the groove base 35, and the steel ring 21, a combined radial and axial seal is established.

In operation, fluid pressures of the order of 15,000 p.s.i. have been contained without recognizable leakage by employing the seal arrangement 20 embodying features of the present invention, as has been pointed out. The seal arrangement 20 achieves this end because the Teflon sealing ring 40, under fluid pressure, intimately conforms to minute imperfections in sealing surfaces such as the cylindrical inner wall 16 of the cylinder 12 and the surfaces 35 and 36 in the groove 30, for example.

More importantly, plastic from the ring 40 will not extrude along any striations, for example, in the circular cylindrical wall 16 while the split steel ring 41 prevents extrusion through the space 26 between the piston 13 and the cylinder wall 16. In like manner, the plastic is of such a nature that it does not extrude through the gap 65 in the split ring 41.

Furthermore, the Teflon ring 40 accommodates tilting of the piston 13 relative to the cylinder 12 without fluid leakage. The radially compressible and expandable steel backup ring 41 also accommodates this tilting, of course. The tilting normally encountered and readily accommodated by the seal arrangement 20 embodying features of the present invention is normally a maximum of 5°. If greater tilting is to be encountered, it is desirable that the rings 40 and 41 be provided with spherical outer surfaces in the manner disclosed in the Gunnar A. Wahlmark Pat. No. 2,956,845, issued Oct. 18, 1960, and entitled PISTON.

The seal arrangement 20 has been discussed in the context of a cylinder-piston assembly 10 since it finds its most valuable application there. It should be recognized, however, that the seal arrangement 20 also finds advantageous application in rotary bearing seals or static seals, with the same excellent results. Furthermore, although the seal ring 40 has been described as fabricated of Teflon, other plastics or rubbers having broadly similar characteristics might be used.

While the embodiment described herein is at present considered to be preferred, it will be understood that various modifications and improvements may be made therein and it is intended to cover in the appended claims all such modifications and improvements as may fall within the true spirit and scope of the invention.

What is desired to be claimed and secured by Letters Patent of the United States is:

1. In a cylinder having a circular cylindrical wall of predetermined diameter and a generally circular cylindrical member of lesser maximum diameter disposed in the cylinder, a seal arrangement for maintaining a fluidtight seal between the member and the wall against fluid under pressure up to in the neighborhood of 15,000 p.s.i. in the cylinder on one side of the seal arrangement, comprising:
   a. an annular groove in said member having a generally rectangular cross section with a right cylindrical base and planar upper and lower surfaces spaced a first distance apart,
   b. said base and upper and lower surfaces having the relatively rough character provided by machining without finish grinding,
   c. a seal assembly seated in said groove,
   d. said seal assembly including a unitary sealing ring fabricated of a tough plastic having properties generally characteristic of the polymers of tetrafluoroethylene,
   e. said sealing ring having an L-shaped cross-sectional configuration, a circular cylindrical inner face of said tough plastic in interference fit with said base of said groove along the entire height of said inner face, and a generally circular cylindrical outer face of said tough plastic in intimate engagement with the wall,
   f. said height normally being less than said first distance whereby a gap is left between said sealing ring and said upper surface on the one side of said sealing arrangement,
   g. and a metal split backup ring opposite said plastic ring from the one side seated in the recess defined by the L-shaped cross-sectional configuration of the said sealing ring whereby a generally planar tough plastic face (portion) of said sealing ring and a generally planar face of said backup ring intimately engage said relatively rough planar lower surface of said groove.

* * * * *